United States Patent
Maire et al.

(10) Patent No.: US 8,948,379 B2
(45) Date of Patent: Feb. 3, 2015

(54) ARCHITECTURE OF AN OPEN LOCAL AREA NETWORK FOR AUDIO SERVICE SUPPORT BETWEEN USERS OF PARTITIONED DOMAINS

(75) Inventors: Francoise Maire, Nanterre (FR); Michel Renaux, Fontenay-aux-Roses (FR); Frederika Baskaradasse, Nanterre (FR); Michel Oustric, Carrieres-sous-Poissy (FR)

(73) Assignee: Thales, Neuilly sur Seine (FR)

( * ) Notice: Subject to any disclaimer, the term of this patent is extended or adjusted under 35 U.S.C. 154(b) by 1051 days.

(21) Appl. No.: 12/594,799

(22) PCT Filed: Apr. 3, 2008

(86) PCT No.: PCT/EP2008/054012
§ 371 (c)(1),
(2), (4) Date: Jan. 6, 2010

(87) PCT Pub. No.: WO2008/125510
PCT Pub. Date: Oct. 23, 2008

(65) Prior Publication Data
US 2010/0115630 A1    May 6, 2010

(30) Foreign Application Priority Data

Apr. 3, 2007   (FR) ..................................... 07 02438
May 11, 2007  (FR) ..................................... 07 03383

(51) Int. Cl.
  *H04K 1/04*    (2006.01)
  *H04L 29/06*   (2006.01)

(52) U.S. Cl.
  CPC ........ *H04L 63/0227* (2013.01); *H04L 65/1076* (2013.01); *H04L 63/105* (2013.01); *H04L 65/1053* (2013.01)

USPC .......................................................... 380/40

(58) Field of Classification Search
USPC .......................................................... 380/40
See application file for complete search history.

(56) References Cited

U.S. PATENT DOCUMENTS 6,889,321 B1 * 5/2005 Kung et al. .................... 713/153
2006/0218399 A1   9/2006 FitzGerald et al.
(Continued)

FOREIGN PATENT DOCUMENTS

EP          0849680 A2   6/1998
EP          1318645 A2   6/2003
(Continued)

*Primary Examiner* — Esther Benoit
(74) *Attorney, Agent, or Firm* — Stroock & Stroock & Lavan LLP

(57) ABSTRACT

The invention relates to a system for data exchange between at least two communication networks using the IP Internet protocol, a first network having a security level N1 higher than the security network N2 of a second network, and several terminals being connected to the first and second networks, characterised in that it comprises at least the following members: means for marking the flows based on their security level, a gateway between the first network (1) and the network (2) for carrying out a protocol interruption, and means for filtering the data flows suitable for checking the marking and to give authorisation for the broadcasting of the flow based on the relevancy between the marker and the sensitivity level of the communication, and visual means on the terminal for indicating to the user whether or not he communicates on a secured media.

15 Claims, 4 Drawing Sheets

(56) References Cited

U.S. PATENT DOCUMENTS

2007/0282752 A1* 12/2007 Jones et al. .................. 705/57
2008/0062995 A1    3/2008 Kaas et al.

FOREIGN PATENT DOCUMENTS

| FR | 2890510 A1 | 3/2007 |
|----|------------|--------|
| WO | 2005083970 A1 | 9/2005 |

* cited by examiner

FIG.2B

ARCHITECTURE OF AN OPEN LOCAL AREA NETWORK FOR AUDIO SERVICE SUPPORT BETWEEN USERS OF PARTITIONED DOMAINS

CROSS REFERENCE TO RELATED APPLICATIONS

The present application is the U.S. National Phase of International Patent Application Serial No. PCT/EP2008/054012, filed Apr. 3, 2008, which claims the benefit of French Patent Application Serial No. 0703383, filed May 11, 2007, and French Patent Application Serial No. 0702438, filed Apr. 3, 2007, all of which are hereby incorporated by reference in their entireties.

FIELD OF THE INVENTION

The invention relates to an architecture in a local area network. It relates, notably, to the domain of Voice over IP (VoIP) open multiservice local area networks (with access to external subscribers) for audio communication in an environment which necessitates security constraints. The data exchanged can have an audio or multimedia format.

The expression open local area network is intended to imply a local area network allowing access to outside subscribers.

PRIOR ART

A first solution described in the prior art consists in making available, in each workstation of a user, a phone terminal per domain. This solution nevertheless presents a few drawbacks listed hereinafter:
lack of user-friendliness of the workstation,
risk of operating error by the user leading to a flaw in security,
for each user, it requires one station per security level,
lack of assurance that the streams are indeed traveling on the right security level.

European patent EP0690604 [Procédé pour assurer la confidentialité d'une liaison phonique et réseau local de télécommunication mettant en oeuvre le procédé"]"Method to assure the confidentiality of an audiolink and local telecommunication network carrying out this method" describes a second solution adapted to local area integrated services digital networks.

Moreover, Voice over IP (VoIP) technology makes it possible to produce open local area networks with commercial off-the-shelf (COTS) constituents. However such facilities employed as they stand do not make it possible to deal with security levels.

The prior art systems using Voice over IP (VoIP) technology which are known to the Applicant do not take into account:
the control of access to broadcasting means, thereby implying that it is not possible to broadcast in a security level of lower level than that of the source; and it is not possible for audio terminals of lower level (N2) to access the broadcasting service,
the control of access to subscribers of telephonic type (internal or external),
the externalization, due to the use of COTS products, of the security solutions.

The abbreviations ISDN correspond to integrated services digital network and ISN to initial sequence number.

Within the framework of the invention, and so as to meet operational requirements, audio exchanges between users hooked up to an IP Internet network of a first security level N1 and users hooked up to an IP network of a second security level N2 (for example: broadcasting, internal or external telephone network), with N1 corresponding to a higher security level than the level N2, are carried out by means of devices which will be described below.

Audio exchanges with the outside are carried out via radio media (radio channel); these radio media can be encrypted ("encrypted radio channel") or unencrypted ("clear radio channel"). In such a context, the "non-sensitive" audio streams (of security level N2) can travel on the network of level N1 and can pass between the networks of level N2 and of level N1. On the other hand, the "sensitive" audio streams (of level N1) may neither travel on the network of level N2, nor pass from the network of level N1 to the network of level N2. The "non-sensitive" audio streams (of level N2) can be exchanged with the outside on "encrypted radio channels" or "clear radio channels". On the other hand, the "sensitive" audio streams (of level N1) can only exit to the outside by way of an "encrypted radio channel". Security mechanisms are defined to guarantee that the audio streams of level N1 only exit the network N1 to the outside on an "encrypted radio channel" and that these streams exit neither to the network N2 nor to facilities of level N2.

In this solution, one and the same terminal simultaneously supports the communications of different security domains; to do this, the terminals are connected to the network which supports the higher security level.

This solution exhibits the following advantages:
it is possible to use IP Internet technology and COTS off-the-shelf software or hardware products, this allows great upgradability of services;
the use of a recorder per domain guarantees high security.

The system and the method according to the invention rely notably on a novel approach allowing: the broadcasting of information between two networks of level which exhibit different security levels, the addition of resources necessary for achieving the IP broadcasting service on a lower level, the addition of access control portals between the domain of high security level and the domain of low security level, the design of the architecture in a context of use of COTS products.

SUMMARY OF THE INVENTION

The invention relates to a system allowing exchanges of data, between at least two domains of security level N1 and of security level N2, the first domain having a security level N1 higher than the security level N2 of the second domain, the first security domain of level N1 comprising a network N1 transporting audio streams using at least the IP and VoIP Internet protocols, characterized in that it comprises at least the following elements:
means ISI, making it possible to insert a marker N1 or N2 into audio streams as a function of their security level, said means being positioned in AUT terminals hooked up to the network N1 of the domain of security level N1,
means FISI N1 and FISI N2, making it possible to filter audio streams, said one or more means FISI N1 being positioned in at least one filtering gateway, and said one or more means FISI N2 being positioned in at least one other filtering gateway, said gateways being hooked up to the network N1 of the domain of security level N1, said gateways being suitable for effecting a protocol break, and a procedure for filtering, as the case may be, FISI N1 or FISI N2, the audio streams, consisting in detecting the presence of a marker N1 or N2 in the audio stream arising from the network N1, and in monitoring the passage of said audio stream in relation to the consistency between the marker detected and the marker configured in said gateway.

One audio stream is, for example, a particular channel of a multimedia communication session.

At least one of the filtering gateways can be of the ISDN-GTW-N2 type, connected to an IP-BX, said ISDN-A-GTW-N2 filtering gateway being suitable for translating the VoIP audio streams arising from the network of level N1 into the ISDN protocol, the streams exchanged between said ISDN-A-GTW-N2 filtering gateway and said IP-BX being ISDN streams.

Said IP-BX or at least one of said IP-BXs is, for example, connected to a network N2 of security level N2.

The system can comprise a professional radio device comprising several mobile radios linked to the network N2 of security level N2 via an ISDN gateway, P_ISDN and the IP-BX device.

The system according to the invention comprises, for example, a professional radio device comprising several radio sets, the radio sets being linked up with AUT terminals via an analog gateway of the device and an analog filtering gateway.

Said IP-BX or at least one of said IP-BXs is connected to an ISDN gateway, P_ISDN, itself linked up with MUT sets of a PMR sub-system, said MUT sets themselves being linked up with an analog gateway ANALOG, itself interconnected with one of the filtering gateways A-GTW-N2 hooked up to the network N1.

A facility of analog type of the domain of security level N2 is, for example, linked with the network N1 of security level N1 by virtue of one of said analog filtering gateways furnished with said means FISI-N2, said analog filtering gateway being of A-GTW-N2 type, suitable for performing the necessary protocol break between the analog and the IP protocol, the protocol break consisting in transforming into an LF audio signal the audio streams received from the network N1, which are furnished with said marker N2, destined for said audio facilities and in transforming into a VoIP-encoded audio stream the LF audio signals received from said facility of analog type having as destination a facility or an AUT terminal hooked up to the network N1.

A facility of analog type of the domain of security level N1 is, for example, linked with the network N1 of security level N1 by virtue of one of said analog filtering gateways furnished with said means FISI-N1, said analog filtering gateway being of A-GTW-N1 type, suitable for performing the necessary protocol break between the analog and the IP protocol, the protocol break consisting in transforming into an LF audio signal the audio streams received from the network N1, which are furnished with said marker N1, destined for said audio facilities and in transforming into a VoIP-encoded audio stream the LF audio signals received from said facility of analog type having as destination a facility or an AUT terminal hooked up to the network N1.

At least one of said means ISI positioned in an AUT terminal can be suitable for controlling a display, for example by means of LEDs hooked up directly, so as to confirm the insertion of a marker N1 or N2 into the audio stream generated to the network N1.

At least one of said means ISI positioned in an AUT terminal is, for example, suitable for inserting said marker according to a chosen period so as to guarantee a distribution of the marker which is a sub-multiple of the send period of the audio packet.

Said markers N1 or N2 differ, for example, from one another by at least one bit at the minimum, upon any comparison after all circular rotations of one of the markers with respect to the other.

Said markers N1 or N2 can differ from one another by at least one bit, over any portion of a given length, at the minimum upon any comparison after all circular rotations of one of the markers with respect to the other, said given length being linked with a detection threshold, either of blockage, or of authorization of passage, of said audio stream, in at least one of said corresponding means FISI-N1 or FISI-N2.

At least one of said means FISI positioned in one of said filtering gateways is, for example, suitable for sending in the return pathway of said audio stream a tone for alerting non-detection of the configured marker, when said marker has not been detected after a deadline linked with the detection of a signal PTT transported in the VoIP encoding of said audio stream.

The signal PTT can be transported either in at least one bit M encoded in the RTP protocol of said audio stream, or in the RTCP signaling encoded in the RTP protocol of said audio stream, or in the audio band of the loads encoded in the RTP protocol.

The system can comprise a filtering device suitable for accepting a loss of packet without loss of detection of marking and therefore of blockage of the audio stream.

The encoding of at least one of said audio streams is, for example, performed by using the G711 A-law or mu-law format.

BRIEF DESCRIPTION OF THE DRAWINGS

Other characteristics and advantages of the present invention will be more apparent on reading the description which follows of an exemplary implementation given by way of wholly nonlimiting illustration, accompanied by the figures which represent.

DETAILED DESCRIPTION OF THE PREFERRED EMBODIMENTS

In order to better elucidate the subject of the invention, the example is given in the case of two networks operating with the IP Internet protocol, a first network having a security level N1 and a second security level N2, with the security level N1 higher than the security level of N2, thereby implying that the data may not travel without control from the network N1 to the network N2.

Of course, the person skilled in the art will extend the technical teaching of the invention to similar system configurations, in particular with two or several security levels, with the absence of one or more of the listed sub-systems and/or the absence of one or more of the links between listed sub-systems, and/or conversely with the presence of one or more unlisted sub-systems and/or the presence of one or more unlisted links between sub-systems.

For example, the invention also applies in the case of domains of different security levels. Thus, the invention applies in respect of a system allowing exchanges of data between at least two domains of security level N1 and of security level N2, the first domain having a security level N1 higher than the security level N2 of the second domain, the first security domain of level N1 comprising a network N1 transporting audio streams using at least the IP and VoIP Internet protocols.

Figure 1:
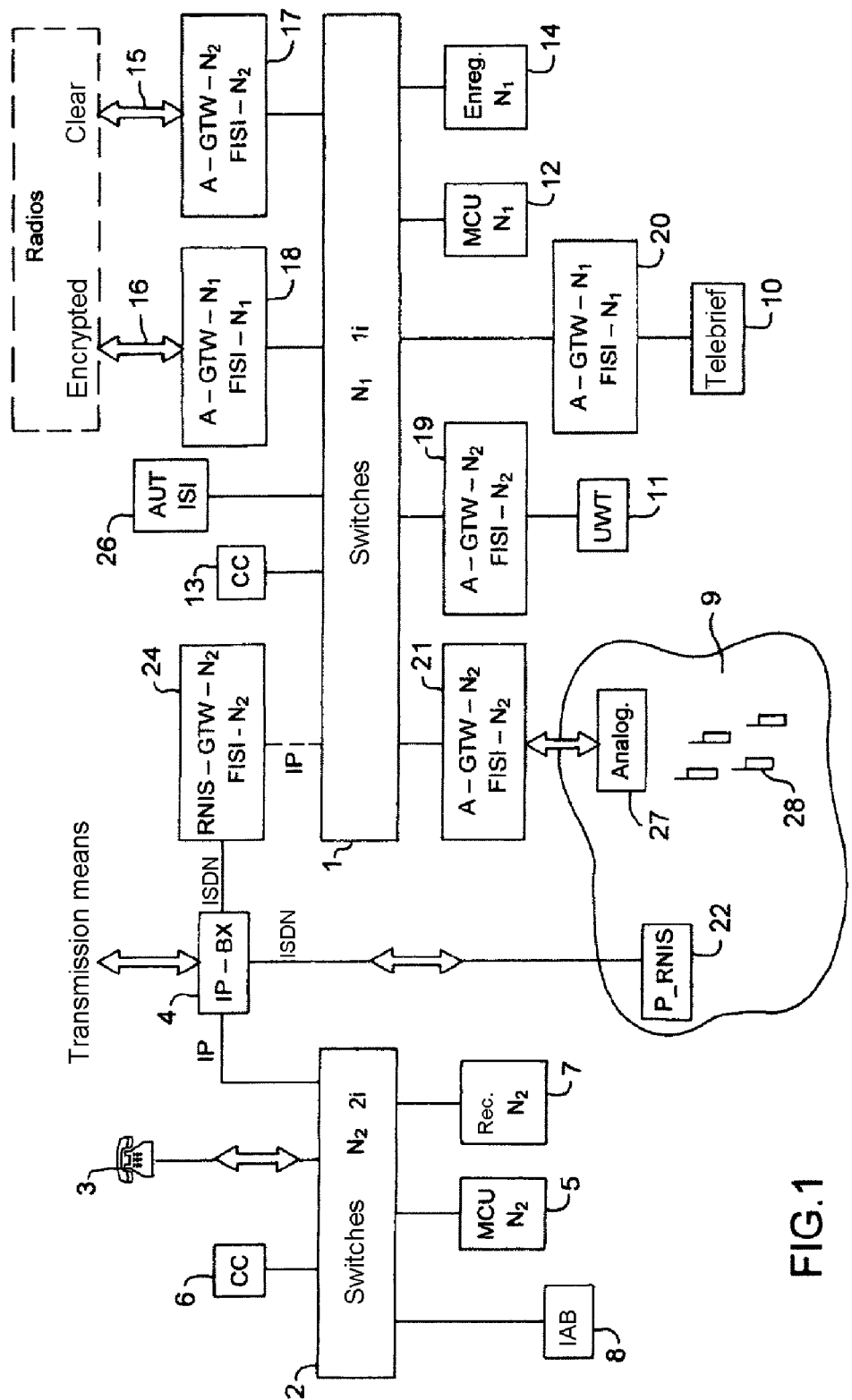
FIG. 1 an exemplary architecture of a system according to the invention, comprising two IP communication networks, having different security levels, FIGS. 2A, 2B and 2C examples of markers inserted into the audio streams of the information.

In the example of FIG. 1, for the sake of simplifying the explanation, the Applicant mentions only networks which can form part of a domain.

FIG. 1 describes an exemplary system in which two IP communication networks exchange data. The first network, dubbed network N1, possesses a security level N1 and the second network, dubbed network N2, a security level N2. Each network possesses switches designated 1$i$ and 2$i$ respectively, to which are hooked up user terminals and audio services facilities. These switches can be COTS facilities for example of level 2 or 3 Ethernet switch type.

The elements of the figure correspond to:
Call controller: CC, 6, 13,
Instruction and Alert Broadcaster: IAB, 8,
Recorder of the network N1 of level N1: Rec. N1, 14,
Recorder of the network N2 of level N2: Rec. N2, 7,
ISDN filtering gateway between the network N1 and the network N2: ISDN-GTW-N2, 24,
Analog filtering gateway with filter FISI-N2: A-GTW-N2, 19, 21,
Analog filtering gateway with filter FISI-N1: A-GTW-N1, 18, 20,
Conferencer of the network N1: MCU N1, 12,
Conferencer of the network N2: MCU N2, 5,
Professional Mobile Radio sub-system: PMR, 9,
Helicopter linkup sub-system: Telebrief, 10,
Underwater telephone: UWT, 11, On the network of level N2, the users have access, for example, to the audio services by IP-Phone terminals 3 (IP telephonic terminals) and Multi-User radio sets (MUT for MultiUser talk) 28 belonging to the professional mobile radio system PMR (Professional Mobile Radio) 9.

On the network N1 of level N1, the users have access to the audio services by IP intercom terminals (AUT) 26, these being IP internal subscribers hooked up directly to one or more of the switches N1 1$i$.

On the network N2, 2, of level N2, the facilities hooked up are, for example:
The IP-Phone terminals 3,
An IP-BX device, 4, the function of which is notably to ensure the switching of the calls and their authorizations,
A conferencer facility (MCU-N2) 5, dedicated to instruction and alert broadcasting, A calls control device, or "Call Controller" (CC) 6, (a method which is usually used in VoIP technology networks to control and maintain the connections once they have been set up),
A recorder-N2 (Rec. N2) 7,
An instruction and alert broadcaster (IAB) 8,
The system for PMR radio 9, via the IP-BX.

On the network N1, 1, of level N1, the facilities hooked up are:
The intercom terminals (AUT) 26, which are, for example, IP internal subscribers hooked up directly. The function of the AUT terminals is notably to insert a marker into the audio streams generated, the marker being connected with the security level,
The telebrief sub-system 10 is an external subscriber hooked up to an analog filtering gateway A-GTW-N1 20 suitable for filtering the audio streams according to the function FISI N1.
The sub-system UWT 11 is an external subscriber hooked up to an analog filtering gateway A-GTW-N2 19 suitable for filtering the audio streams according to the function FISI N2.
A conferencer facility (MCU-N1) 12,
A calls control device or Call Controller (CC) 13,
A recorder-N1, 14,
One or more analog filtering gateways A-GTW-N1 18 allowing communications between the AUT intercom terminals 26 and analog radio facilities: encrypted radio channels 16,
One or more analog filtering gateways A-GTW-N2, 17, allowing communications between the AUT intercom terminals 26 and analog radio facilities: clear radio channels, 15.

The PMR (Professional Mobile Radio) system consists, for example, of an analog gateway ANALOG, 27, hooked up to the network N1 via an analog filtering gateway A-GTW-N2 21, the part ANALOG 27, forming part of the PMR system, and of a "gateway" P_ISDN 22, hooked up to the network N2 via the IP-BX 4. The facilities of this system are considered to be of security level N2. The MUT radio sets 28$i$ can exchange non-sensitive streams between themselves, with the AUT intercom terminals 26, with the IP-phones 3, and with the instruction broadcaster (IAB) 8. The paths followed by the communications with a set of the PMR system are described further on in the description.

An exemplary matrix of the streams exchanged between the various terminals and facilities, with their sensitivity levels, is given in the table hereinafter.

TABLE I

| Origin | Destination | | | | | | | |
| --- | --- | --- | --- | --- | --- | --- | --- | --- |
| | AUT | MUT | IP-Phone | Telebrief | UWT | IAB | Encrypted Radio | Clear Radio |
| AUT | N1 or N2 | N2 | N2 | N1 | N2 | N2 | N1 | N2 |
| MUT | N2 | N2 | N2 | X | X | N2 | X | X |
| IP-Phone | N2 | N2 | N2 | X | X | N2 | X | X |
| Telebrief | N1 | X | X | X | X | X | X | X |
| UWT | N2 | X | X | X | X | X | X | X |
| IAB | X | X | X | X | X | X | X | X |
| Encrypted radio | N1 | X | X | X | X | X | X | X |
| Clear Radio | N2 | X | X | X | X | X | X | X |
| Encrypted radio return | N1 | X | X | X | X | X | X | X |
| Clear radio return | N2 | X | X | X | X | X | X | X |

The system and the method according to the invention rely notably on the joint systematic use:

Of a protocol break,

Of a mechanism for marking and filtering the audio streams.

The analog filtering gateways (A-GTW-N1, A-GTW-N2) 17, 18, 19, 21 implement an IP/analog protocol break and a streams filtering procedure (FISI).

The ISDN filtering gateway ISDN-GTW-N2, 24, performs an IP/ISDN protocol break and a streams filtering procedure (FISI).

A mechanism for marking the streams (ISI) is implemented in the AUT terminals which simultaneously access services of levels N1 and N2.

Protocol Breaks

Principle

The protocol break consists in transmitting the signaling information and the user information received on one port of the facility in one protocol, on another port of the facility, in another protocol. These protocol breaks make it possible in particular to eliminate the signaling-related "hidden channels", without altering the user information.

Application to the Partitioning of Networks

The protocol breaks implemented by the IP-BX device, 4, and by the ISDN filtering gateway ISDN-GTW-N2, 24, consist, for example, for the ISDN filtering gateway ISDN-GTW-N2, 24, in translating into the ISDN protocol, the VoIP-encoded audio streams received from the switches of the network N1, 1, of level N1, and for the IP-BX, 4, in translating the streams arising from the switches of the network of level N2 into the ISDN protocol. The audio streams exchanged between the ISDN filtering gateway ISDN-GTW-N2, 24, and the IP-BX, 4, are streams encoded according to the ISDN protocol that is well known to the person skilled in the art.

The protocol breaks implemented by the analog filtering gateways of A-GTW type (A-GTW-N1 or A-GTW-N2) 17, 18, 19, 21 consist in transforming into a low-frequency audio signal (LF) the IP streams received from the switches 1i of the network N1 destined for the audio facilities linked to the network concerned and in transforming into an IP stream the audio signals (LF) received from the audio facilities having the IP network as destination.

If variants of the ISDN and IP protocols are used, for example Ipv6, the filter and protocol break mechanisms are still used without departing from the scope of the invention.

Marking and Filtering Functions

Principle

Figure 2A:
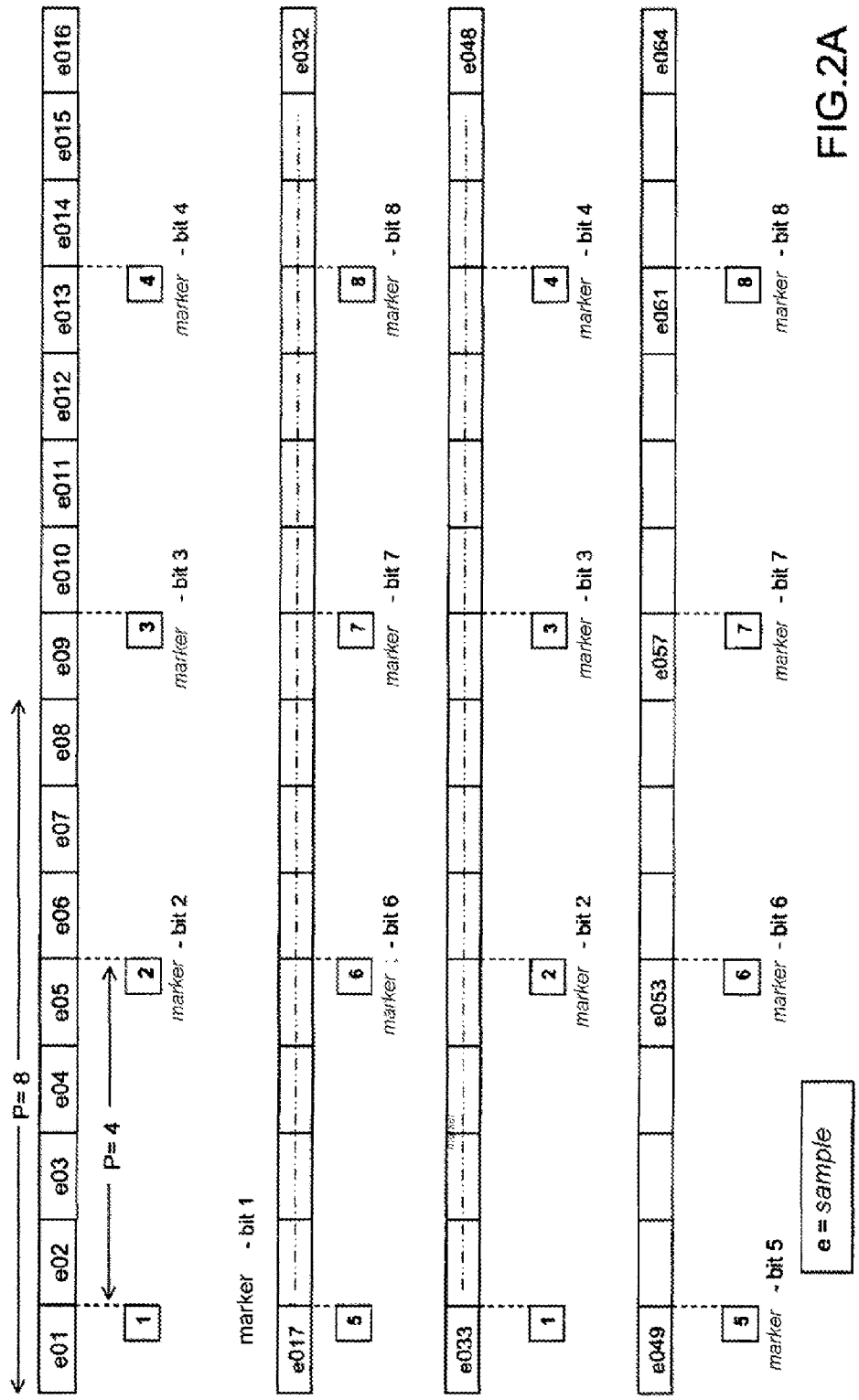
Figure 2B:
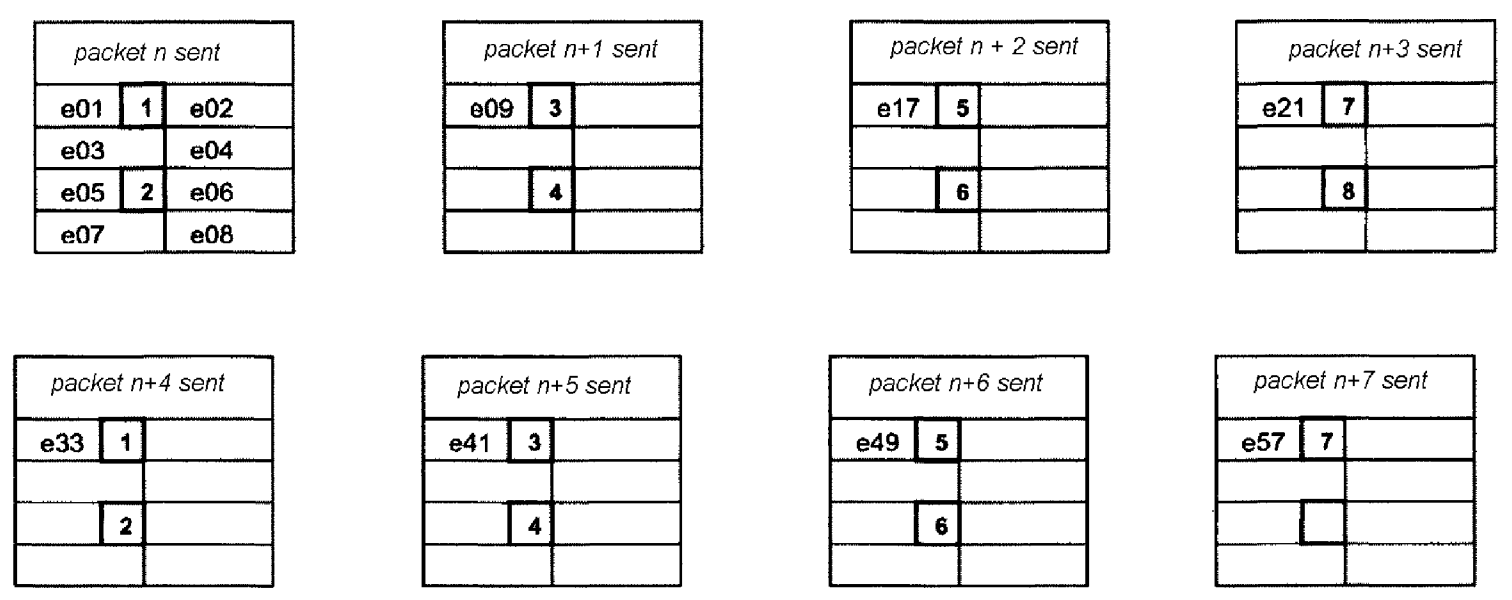
Figure 2C:
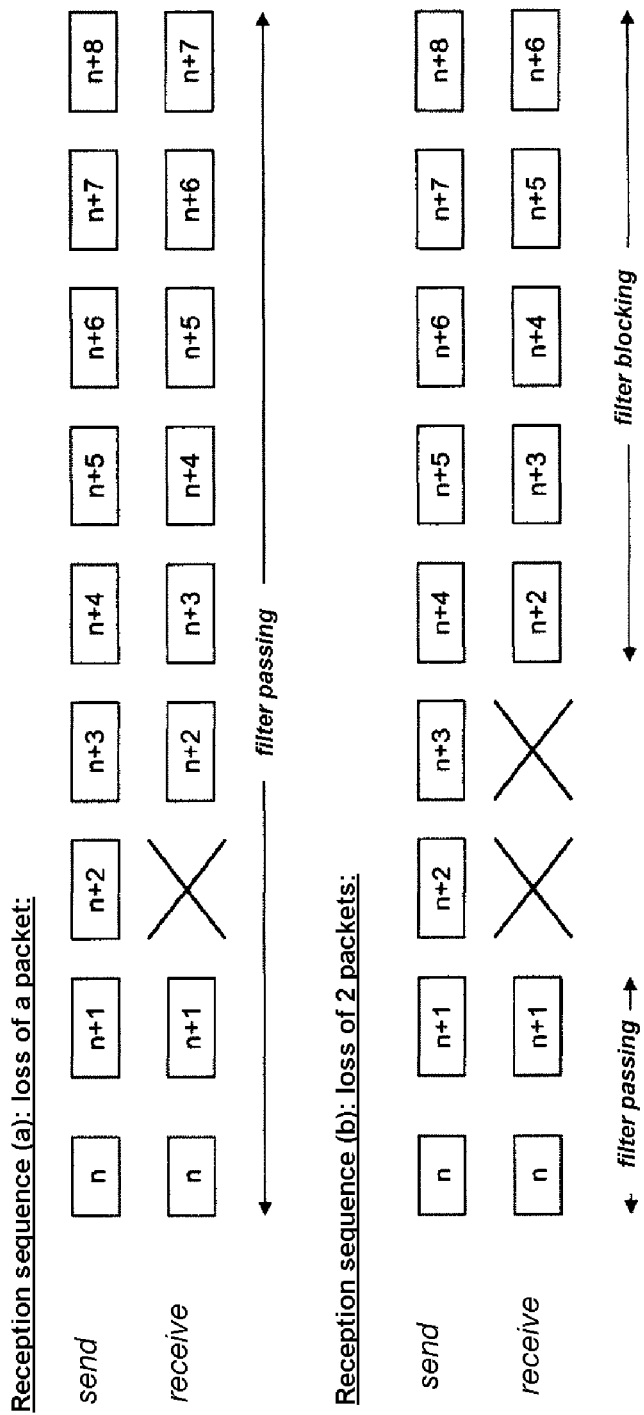

FIGS. 2A, 2B and 2C represent examples of integrating markers into the audio streams.

The marker principle relates notably to digital local area telecommunication networks characterized by:

Simultaneous use of a protocol dedicated to the signaling (setting up and releasing of communications) and of a protocol dedicated to the audio streams.

Transmission in packet mode with a guarantee of the chronology of the packets.

By way of example, this principle is applicable to the VoIP network operating the H323 or SIP or MGCP protocols.

This invention is applied to IP streams transporting at least one audio channel (audio stream) whose encoding is able to undergo a marking which causes acceptable audio quality degradation. The teaching is therefore limited to such encodings and must be adapted to the particular characteristics of the encoding adopted. On a local area network, the G711 A-law and/or mu-law encoding of the ITU-T is preferably used. In general the coding of such an IP stream is carried out sender side of the IP stream in accordance with an IP/VoIP encoding protocol stack and comprises the implementation of an RTP (Real Time Protocol) virtual channel to ensure the end-to-end transport of the audio loads in IP packets. The IP stream may exceptionally undergo losses of IP packets or a desequencing. An IP/VoIP decoding protocol stack performs reception side of the IP stream, the rescheduling of the loads constituting the audio stream within the limit of an anti-jitter buffer, the optional introduction of substitution loads in the case of loss of IP packet or of jitter greater than the threshold admissible by the anti-jitter buffer, and reconstructs the digital audio train in the applicable coding law.

Sender side, a device spliced into the audio stream, integrates identification information into the audio stream, which information may not be separated therefrom.

The system comprises, for example, a device for inserting the marker according to the period chosen so as to guarantee a distribution of the marker which is a sub-multiple of the send period of the audio packet.

Reception side, a device spliced into the audio stream analyzes the audio stream and permits the latter to pass only if the marker has been found.

In a digital network the audio signal is periodically sampled, coded and then compressed. Each sample therefore represents the instantaneous amplitude of the signal. Whatever coding law is used, the low-order bit (LSB) of a sample is the least significant. It is therefore possible to periodically alter the latter bit without significantly degrading the quality of the signal.

In a non-synchronous packet transmission network, the loss of a packet containing the audio stream does not have to be excluded (jitter, momentary saturation, clock slippage). Consequently the marker insertion and filtering mechanism must be robust to packet loss.

The parameters characterizing the marker are, for example, functions of the expected performance (example: latency time, signal/noise ratio), of the characteristics of the encoding, in particular of the size of the blocks of encoded audio (1 byte in the case of the G711 law), of the position of the low-order bits able to undergo the marking, of the characteristics of the protocol notably the number of encoded samples or blocks transmitted per packet, of the performance of the network (transmission error rate).

In the particular case of the G711 coding, these parameters of the marker are chosen, for example, from among the following list:

The length of the marker (L)

The spacing (P) indicating the number of samples between 2 bits of the marker

The interval (N) between 2 markers.

In a particular mode where $N=0$, the spacing (P) is a sub-multiple of the number (E) of samples transmitted in an encoding packet by the IP/VoIP stack sender side of the IP stream. The marker bits are then positioned in bytes of the same rank in the loads of the successive IP packets of the RTP channel.

This arrangement allows an optimal defense against the losses of IP packets liable to affect the RTP channel. On the one hand the implementation of the filter function is simplified, on the other hand, it is then advantageous to configure the admissible number of successive erroneous bits in a marker at E/P so as to allow the loss of an IP packet without causing a blockage of the filter.

Moreover, to simplify the implementation of the filter function, it is desirable that the spacing (P) be a sub-multiple of the number of samples transmitted in a packet (E).

In our example of FIG. 2A, the marker is characterized by: $E=8, L=4, P=4, N=0$.

The filter operates according to 2 phases:

>Marker search: during this phase, the filter searches for the synchronization in the audio stream of the marker. When the marker is found, the filter becomes passing. In a variant, it is possible to leave the filter passing during the search for the marker over a period not exceeding L×P×N.

In a non-exclusive particular mode of the previous particular mode, the search for the marker is initiated only on activation of an alternation signal PTT (Push-to-Talk) by the sender of the IP stream transported for example in the RTCP protocol of the RTP channel of the IP stream, and more particularly by the positioning of one or more bits M of said protocol. This mode makes it possible as an option to fix a maximum duration of active search for the marker and as an option to trigger a signaling (for example a tone on the return pathway of the communication) when the marker is not detected in full or part according to the case in question. The operator of an AUT terminal whose ISI function inserts the marker can thus be forewarned of an anomaly at the level of the filter FISI N1 or FISI N2 reception side of the IP stream. Such an alert indicates to the operator an error in steering the IP stream according to the optimization of the method, either to the analog filtering gateway of one of the types A-GTW-N1, A-GTW-N2, or of both types, or optionally in a particular mode to the ISDN filtering gateway ISDN-GTW-N2.

>Detection of marker loss: the filter passes to this phase when it is synchronized. In this phase, the filter checks whether in the packet received the expected markers are available. If the expected marker is absent, the filter checks whether the marker received corresponds to the sequence of the marker shifted by n×E samples, if such is the case the filter remains passing, with "n" representing the number of packets permitted to be lost without alteration of the quality of the transmission.

FIGS. 2B and 2C illustrate a particular case of the previous example where the parameter "n" equals 1.

FIG. 2B presents an extract of the sequence of packets constituting the audio stream furnished with its marking as defined previously. The packets sent in the order of numbering (n) to (n+7) comprise a marking in the samples according to the previous teaching: the successive bits constituting the successive positions of the marker are represented by boxed increasing digits, and positioned in the low-order bit (LSB) of the marked samples.

In the example of "Reception sequence (a): loss of one packet" of FIG. 2C, when the filter receives the packet "n+3", it expects to receive the bits "5" and "6" of the marker. By comparing the packet received, the filter notes the absence of the bits "5" and "6". Nevertheless, it detects the presence of the bits "7" and "8" and therefore remains passing.

In the example of "Reception sequence (b): loss of 2 packets" of FIG. 2C, when the filter receives the packet "n+4", it expects to receive the bits "5" and "6" of the marker. By comparing the packet received, the filter notes the absence of the bits "5" and "6" and does not detect the presence of the bits "7" and "8", consequently the filter becomes blocking.

The filtering device is for example suitable for accepting a loss of packet without loss of detection of marking and therefore of blockage of the audio stream.

Application to the Partitionings of Networks

In the example illustrated by FIG. 1, the principle of securing the filtering/marking functions consists, respectively, in inserting/analyzing a marker representative of the sensitivity of the information in the transported data.

This marker is inserted by a device in accordance with the principle defined above carried out according to the techniques known to the person skilled in the art.

The marker makes it possible to forewarn the user of the terminal hooked up to the network N1 of the sensitivity of the communication.

These functions are implemented:

in the user terminals (ISI marking function)

in the ISDN filtering gateway ISDN-GTW-N2 (filtering function FISI)

in the analog filtering gateways A-GTW-N1 or A-GTW-N2 requiring it (filtering function FISI), In the AUT terminals 26 the function for marking the terminal inserts, if necessary, a marker by a splicing mechanism and informs the user of the marker inserted by a visual mechanism (LEDs and display, for example).

In the filter gateways, the filtering mechanism checks the marking and permits only the streams whose marker is consistent with the sensitivity level of the communication to exit. This function makes it possible to guard against a possible defect in routing the streams.

Marking Function (ISI)

In this exemplary embodiment, there exist 3 possible markers for the streams:

Marker N1: for the "sensitive" streams destined for the outside,

Marker N2: for the "non-sensitive" streams permitted to exit the network N1,

No marker: for the streams remaining internal to the network N1.

Without departing from the scope of the invention, and as a function of the envisaged applications, it is possible to contemplate other types of markers.

The streams exchanged on the network N1 have the following marking characteristics:

Stream N1 exiting the network N1 (via the encrypted radio channels, 16): marking N1

Stream N1 internal to the network N1 (between AUT,): no marking

Stream N1 entering the network N1 (via the encrypted radio channels): no marking Stream N2 exiting the network N1: marking N2 (via the clear radio channels, or communication with the IP-phones, the MUT radio sets, the instruction and alerts broadcaster IAB, the UWT telephone)

Stream N2 originating from the network N2 entering the network N1: no marking (communication with the IP-phones and the MUT radio sets which are the terminals of the PMR System)

Stream N2 entering the network N1 by an analog filtering gateway A-GTW-N1: no marking (via the clear radio channels or communication with the UWT or "conference" with an MUT radio set).

A display mechanism can be coupled to this marking. This mechanism is embodied for example by means of 2 LEDs fitted to the AUT terminals. The combination of states of the 2 LEDs makes it possible to alert the user of the sensitivity level of the audio streams. As a supplement a display of colors on the screen of the terminal can indicate the sensitivity level of the communications to be set up, for example:

red for "sensitive" communications, blue for "non-sensitive" communications.

In a preferential mode, the ISI markers insertion function, implemented in the AUT terminals, marks the streams and activates the LEDs, by means of an FPGA component, in the following manner:

TABLE II

| Stream | Marker | LED 1 (green) | LED 2 (red) |
|---|---|---|---|
| Exiting on clear radio channel 15 | Marker N2 | Off | Flashing red |
| Exiting on encrypted radio channel 16 | Marker N1 | Steady green | Off |
| Remaining internal to network N1 | No marker | Steady green | Off |
| Exiting to network N2 | Marker N2 | Off | Flashing red |
| Exiting to facility N2 hooked up to an A-GTW gateway (UWT) | Marker N2 | Off | Flashing red |
| Exiting to the PMR radio | Marker N2 | Off | Flashing red |

Variant implementations of the marking function can be employed by the person skilled in the art without departing from the scope of the invention.

Filtering Function (FISI)

The function implemented in the filtering gateways, analyzes the marking of the streams and performs the filtering operations (permitting or disallowing a stream to exit a network).

The system possesses a filtering function "FISI N1" which processes the streams of security level N1 and a filtering function "FISI N2" which processes the streams of security level N2.

Function "FISI N1": The function verifies that the stream is marked N1 and it blocks it if this is not the case.

Function "FISI N2": The function verifies that the stream is marked N2 and it blocks it if this is not the case.

Conferencer

On the network of level N1, the following communication types require a conferencer:

Recording of the communications (to broadcast the streams both to the recorder N1 and to the recipient terminal), Conference between AUT terminals, Telebrief.

On the network N2, the communications of "Broadcasting of Instructions and Alerts" type, via the sub-system IAB 8, for broadcasting to the various loudspeakers and klaxons, require a conferencer.

Each network, N1 and N2, possesses its own conferencer MCU N1, 12, for the network N1 and MCU N2, 5, for the network N2.

The conferencers (MCU) are, for example, facilities termed COTS off-the-shelf facilities. They erase any marking; the streams output by these facilities are no longer marked, whatever their marking at input. Certain A-GTW analog filtering gateways possess their own integrated conferencer.

Communications with the MUT Radio Sets

The communications between MUT radio sets, in direct or "talk group" mode, remain internal to the PMR system 9.

The point-to-point communications, between an MUT radio set and an AUT terminal or between an MUT terminal and an IP-Phone, travel through the "ISDN gateway" (P_ISDN) 22 of the PMR system and through the IP-BX 4.

The broadcasts to the IAB 8, initialized by an MUT radio set, travel through the "ISDN gateway" (P_ISDN) 22 of the PMR system 9 and through the IP-BX 4.

The communications of "conference" type (MUT radio set participating in a conference between AUT terminals or AUT participating in a "talk group") travel through the "mobile radio/analog gateway" (ANALOG) 27 of the PMR system and through an analog filtering gateway A-GTW-N2 21 furnished with a filter N2. The "conferences" of type "MUT radio set participating in a conference between an AUT terminal" require a conferencer; it is the conferencer integrated into the analog filtering gateway A-GTW-N2 21 which is implemented. The "conferences" of type "talk group" are processed at the level of the PMR system.

Recording of the Communications

The various types of communications are recorded for example according to the following modalities:

The communications between AUT terminals 26 and IP-Phone 3 are recorded by the recorder Rec. N1, 14 of the network N1, 1.

The point-to-point communications between an AUT terminal 26 and an MUT radio set 28 are recorded by the recorder Rec. N2, 7 of the network N2, 2, The communications to the Broadcaster of Instructions and Alerts IAB, 8 are recorded by the recorder Rec. N2, 7 of the network N2, 2, The communications along the radio channels (clear or encrypted), are recorded by the recorder Rec. N1, 14 of the network N1, 1 and the conferencer used is that integrated into the analog filtering gateway A-GTW hooking up the radio channel: A-GTW-N1, 18 or A-GTW-N2, 17, The communications with the UWT facility, 11 are recorded by the recorder Rec. N1, 14 of the network N1, 1; the conferencer used is that integrated into the analog filtering gateway A-GTW-N2, 19 hooking up the UWT facility, 11.

Radio Return

In the case of the communications exiting through radio channels, a "radio return" is sent from the corresponding analog filtering gateway A-GTW-N1, 18 or A-GTW-N2, 17, analog gateway A-GTW-N1, 18 or A-GTW-N2, 17, to all the AUT terminals, 26 participating in the radio channel considered and/or to the recorder Rec. N1, 14. These streams output by an analog filtering gateway A-GTW are no longer marked, whatever their marking at input.

A way of implementing the invention is described hereinafter.

Choosing the Parameters of the Marker:

The law for encoding the audio is G711 of the ITU-T.

The spacing (P) indicating the number of samples between 2 consecutive bits of the marker will preferably be between 4 and 16, the value 4 corresponding to the acceptable noise threshold which is introduced by the marker into the audio stream.

The number (E) of samples in a packet will preferably be one of the usual values in Voice over IP, for example for an A-law or μ-law G711 coding: 80 bytes (10 milliseconds of encoded audio in G711), 160 bytes (20 milliseconds of encoded audio in G711), 240 bytes (30 milliseconds of encoded audio in G711).

The length of the marker is between a few tens of bits and may reach a high value, for example 10000 when P is small. The upper limit originates from the temporal constraint of detecting the marker in full or part by the filter FISI N1 or FISI N2: for example L=4096, P=8, and N=0 corresponds to a duration for inserting the marker into the audio stream of about 4 seconds. If the markers N1 and N2 are chosen so as to be sufficiently different, it is then possible in a variant to configure the filter so that it toggles to the passing state in advance after a part of the marker is detected (for example 128 bits which represent 128 milliseconds with the above parameter values). It is also possible in another variant that the filter FISI N1 or FISI N2 is passing as soon as a PTT signaling associated with the audio stream is detected and that it turns off when it has not detected a part of the marker after a certain deadline. The latter variant has the advantage of not deleting the first phonemes transported by the audio stream controlled by the analog filtering gateway A-GTW-N1, A-GTW-N2 or by the ISDN filtering gateway ISDN-GTW-N2.

An advantage of the invention is that by employing markers of great length L, optionally coupled with a nonzero value of N, it is made difficult to detect the marker by analyzing the packets of the marked audio streams.

Variants for choosing the parameters of the marker are conceivable without departing from the scope of the invention.

Choosing the Two Markers N1 and N2:

The markers must be at the minimum different upon any comparison after all circular rotations of one of the markers with respect to the other.

When the filter is designed to turn back on (or turn off) in anticipation after the reception of a part only of the marker, the markers N1 and N2 must differ from one another over any portion of length of the part considered, for all circular rotations of one of the markers with respect to the other. Quite obviously, the person skilled in the art will be able to define markers having particular properties without departing from the scope of the invention.

Linking up the Constituents of the System:

Within the framework of the architecture presented in FIG. 1, the best way of linking up the constituents of the system is presented in the tables introduced below. Three major categories of linkups are developed:

Table III: Point-to-point communications (without recording)

Table IV: Point-to-point communications with recording

Table V: Conferences.

These tables grouped together in the annex summarize, for all possible stream exchanges, the facilities traversed, the actions performed by the facilities traversed and the protocols implemented. The streams concerned are the audio streams exchanged, off-signaling and after the communications have been set up.

For each category of linkup, the main constituents considered as origin or destination of the audio streams are the intercom terminals (AUT), the radio sets (MUT) of the PMR sub-system, the IP-Phone terminals, the underwater telephones (UWT), the Clear Radio sub-system and the Encrypted Radio sub-system. In certain cases of use, the Encrypted Radio or Clear Radio sub-system generates a modulation check (side tone): this modulation check can be generated at the level of the analog filtering gateway A-GTW by copying the send pathway before the marker filtering function is applied. It can constitute the point of departure of an autonomous audio stream whose origin is dubbed Encrypted Radio Return or Clear Radio Return, or else be mixed with the reception radio pathway by means of a conferencer in the A-GTW.

The main constituents during passage of the audio streams or during recording are: the IP-BX telephone exchange office (in voice over IP technology with ISDN access), the analog filtering gateways A-GTW-N1, A-GTW-N2, the LANs N1 and N2, the audio stream recorders (Rec. N1, Rec. N2), the conferencers (MCU N1, MCU N2) making it possible to duplicate a point-to-multipoint audio stream, the Instruction and Alert Broadcaster (IAB). The Clear Radio and Encrypted Radio sub-systems comprise a Sender/Receiver (S/R) facility, and optionally a cryptographic facility (crypto) in the Encrypted Radio case.

The person skilled in the art can extend the technical teachings which follow to variants of the architecture comprising other constituents or other linkups.

The tables detail the implementation of each of the three categories of linkup between different constituents: the rows of the table (labeled "Origin") correspond to streams whose origin is the indicated constituent and whose destination (or destinations) is the constituent indicated in the labeling of the column (labeled "Destination"). Two sub-columns not demarcated by a dividing line are labeled "Facility" and "Action Protocol". The "Facility" sub-column lists constituents traversed successively by the audio stream (departure, passage, destination) and the "Action Protocol" sub-column lists, opposite each constituent, processing information applicable to the audio stream which traverses the constituent, and/or to the constituent itself.

The protocols listed are: IP, ISDN and LF: LF signifies "Low Frequency" and signifies a representation of the audio stream in one of the analog forms that are well known to the person skilled in the art, for example in baseband (300-3000 Hz).

The actions listed are of various natures:

The actions linked with the optional insertion of the marker into the audio stream are interpreted according to table II: "No mark" signifies that there is no insertion of a marker into the audio stream. "Mark N1" signifies insertion of the marker N1 into the audio stream, "Mark N2" signifies insertion of the marker N2 into the audio stream, "LED1 green" signifies that LED 1 is "steady green". "LED1 off" signifies that LED 1 is "Off". "LED2 off" signifies that LED 2 is "Off". "LED2 red flash" signifies that LED 2 is "Flashing red".

The actions linked with the analog filtering gateways A-GTW-N1, A-GTW-N2, and ISDN-GTW-N2 are: "Filter" which signifies detecting the marker N1 or N2 configured in the analog filtering gateway considered, "Broadcast to" which signifies an action for duplicating the stream to several named constituents, "unmark" which signifies the deletion of the marker N1 or N2 from an audio stream, "IP->LF" which signifies the transcoding of the audio stream in IP packet form into LF analog form, "LF->IP" which signifies the transcoding of the audio stream in LF analog form into the form of an audio stream in IP packet form, "ISDN->IP" which signifies the transcoding of the audio stream in digital channel form into the form of a stream into IP packet form, "IP->ISDN" which signifies the transcoding of the audio stream in IP packet form into the form of a digital channel.

The actions linked with a "crypto" facility are: "Encrypt" which signifies encrypting an LF audio signal to obtain a signal dependent on the cryptographic facility, for example modulated LF, "Decrypt" which signifies decrypting a signal dependent on the cryptographic facility to produce an LF audio signal.

The actions linked with a "Rec." constituent are: "Record" which signifies recording the audio stream corresponding to the IP stream in the recorder.

The actions linked with the PMR sub-system are: "ISDN side" which signifies that the link is implemented via the IP-BX/ISDN access, "Analog side" which signifies that the link is implemented via an analog gateway.

The actions linked with an "MCU" constituent are: "Unmark" which signifies a processing, the effect of which is that the IP stream or streams generated have no marking (whether or not there was a marking previously), "Broadcast to" which signifies duplicating the IP stream to one or more recipients.

Interpretation of Table III: Point-to-Point Communications (Without Recording):

An "X" box signifies that the origin stream (label of the indicated row) cannot reach the destination (label of the indicated column).

Example of Reading the Box: Origin "AUT"/Destination "AUT":

The audio stream is encoded in the AUT 1 without a marker, LED 1 is steady green and LED 2 is flashing red on the AUT terminal 1 (sender of the audio stream). The audio stream travels through the LAN N1 using the IP protocol. The recipient is an AUT terminal 2.

Example of Reading the Box: Origin "AUT"/Destination "Encrypted Radio":

The audio stream is encoded in the AUT 1 with marker N1, LED 1 is steady green and LED 2 is turned-off red on the AUT terminal 1 (sender of the audio stream). The audio stream travels through the LAN N1 using the IP protocol. The stream travels through the analog filtering gateway A-GTW-N2 which is passing in the presence of the marker N2, and unmarks the stream by converting it into an LF signal, said signal being encrypted in the cryptographic facility "Crypto" to be sent by the sender/receiver (S/R).

The other cases dealt with by table III are interpreted in a similar manner by means of the previous information and inform the person skilled in the art regarding the linkups of point-to-point type without recording of the system according to the invention.

Interpretation of Table IV: Point-to-Point Communications with Recording:

An "X" box signifies that the origin stream (label of the indicated line) cannot reach the destination (label of the indicated column).

Example of Reading the Box: Origin "AUT"/Destination "AUT":

The audio stream is encoded in the AUT 1 without a marker, LED 1 is steady green and LED 2 is flashing red on the AUT terminal 1 (sender of the audio stream). The audio stream travels through the LAN N1 using the IP protocol. The intermediate recipient is the MCU conferencer N1 which unmarks the IP stream and broadcasts it the corresponding audio stream to an AUT terminal 2 on the one hand and to a recorder Rec. N1 on the other hand. Each of these audio streams is encoded in an IP stream which traverses the LAN N1 using the IP protocol.

The other cases dealt with by table IV are interpreted in a similar manner by means of the previous information and inform the person skilled in the art regarding the linkups of point-to-point type with recording of the system according to the invention.

Interpretation of Table V: Conferences:

An "X" box signifies that the origin stream (label of the indicated line) cannot reach the destination (label of the indicated column).

Example of Reading the Box: Origin "AUT"/Destination "AUT":

The audio stream is encoded in the AUT 1 without a marker, LED 1 is steady green and LED 2 is flashing red on the AUT terminal 1 (sender of the audio stream).

The audio stream travels through the LAN N1 using the IP protocol. The intermediate recipient is the MCU conferencer N1 which unmarks the IP stream and broadcasts it the corresponding audio stream to several AUT terminals. Each of these audio streams is encoded in an IP stream which traverses the LAN N1 using the IP protocol.

The other cases dealt with by table V are interpreted in a similar manner by means of the previous information and inform the person skilled in the art regarding the linkups of conference type of the system according to the invention.

SUMMARY OF THE INVENTION

The main invention relates to a system allowing exchanges of data, between at least two domains of security level N1 and of security level N2, the first domain having a security level N1 higher than the security level N2 of the second domain. The first security domain of level N1 comprises a network N1, 1 transporting audio streams using at least the IP and VoIP Internet protocols, comprising at least the following elements:

means ISI, making it possible to insert a marker N1 or N2 into audio streams as a function of their security level, said means being positioned in AUT terminals, 26, hooked up to the network N1, 1, of the domain of security level N1, means FISI N1 and FISI N2, making it possible to filter audio streams, said one or more means FISI N1 being positioned in at least one filtering gateway, 17, 18, 20, and said one or more means FISI N2 being positioned in at least one other filtering gateway, 17, 19, 21, 24, said gateways being hooked up to the network N1, 1, of the domain of security level N1, said gateways being suitable for effecting a protocol break, and a procedure for filtering, as the case may be, FISI N1 or FISI N2, the audio streams, consisting in detecting the presence of a marker N1 or N2 in the audio stream arising from the network N1, and in monitoring the passage of said audio stream in relation to the consistency between the marker detected and the marker configured in said gateway.

In a particular mode of the main system, audio streams consist of a particular channel of a multimedia communication session.

In another particular mode of the main system or of the previous system, the system comprises at least one of the filtering gateways which is of the ISDN-GTW-N2 type, 24, connected to an IP-BX, 4, this ISDN-A-GTW-N2 filtering gateway being suitable for translating the VoIP audio streams arising from the network of level N1, 1 into the ISDN protocol. The streams exchanged between this ISDN-A-GTW-N2 filtering gateway and this IP-BX are ISDN streams.

In a particular mode of the previous system, the IP-BX, 4, or at least one of the IP-BXs, is connected to a network N2, 2, of security level N2. The previous two particular modes of the system are dubbed "systems with ISDN filtering gateway ISDN-GTW-N2".

In a particular mode of any one of the "systems with ISDN filtering gateway ISDN-GTW-N2" defined above, the system comprises a professional radio device, 9, comprising several mobile radios linked to the network N2, 2, of security level N2 via an ISDN gateway, P_ISDN, 22, and the IP-BX device, 4.

In another particular mode of any one of the "systems with ISDN filtering gateway ISDN-GTW-N2" defined above, the system comprises a professional radio device, 9, comprising several radio sets, the radio sets being linked up with AUT terminals, 26, via an analog gateway, 27, of the device and an analog filtering gateway, 21.

In another particular mode of any one of the "systems with ISDN filtering gateway ISDN-GTW-N2" defined above, the system comprises an IP-BX, 4, or at least one of the IP-BXs which is connected to a P_ISDN ISDN gateway, 22, itself linked up with the MUT sets, 28, of a PMR sub-system, 9, said MUT sets themselves being linked up with an analog gateway ANALOG, 27, itself interconnected with one of the filtering gateways A-GTW-N2, 21, hooked up to the network N1, 1.

In a particular mode of any one of the preceding systems, the system comprises a facility of analog type, 11, 27, 15, of the domain of security level N2 which is linked with the network N1, 1, of security level N1 by virtue of one of the analog filtering gateways which is furnished with the means FISI N2. This analog filtering gateway is of A-GTW-N2 type, 19, 21, 17. This analog filtering gateway is suitable for performing the necessary protocol break between the analog and the IP protocol, the protocol break consisting in transforming into an LF audio signal the audio streams received from the network N1, which are furnished with said marker N2, destined for the audio facilities and in transforming into a VoIP-encoded audio stream the LF audio signals received from this facility of analog type having as destination a facility or an AUT terminal, 26, hooked up to the network N1.

In a particular mode of any one of the preceding systems, the system comprises a facility of analog type, 10, 16, of the domain of security level N1, which is linked with the network N1, 1, of security level N1 by virtue of one of the analog filtering gateways which is furnished with the means FISI N1. This analog filtering gateway is of A-GTW-N1 type, 20, 18. This analog filtering gateway is suitable for performing the necessary protocol break between the analog and the IP protocol, the protocol break consisting in transforming into an audio signal (LF) the audio streams received from the network N1, which are furnished with said marker N1, destined for said audio facilities and in transforming into a VoIP-encoded audio stream the audio signals (LF) received from the facility of analog type having as destination a facility or an AUT terminal, 26, hooked up to the network N1.

In a particular mode of any one of the preceding systems, the system comprises at least one of the means ISI positioned in an AUT terminal, 26, which is adapted for controlling a display, for example by means of LEDs hooked up directly, so as to confirm the insertion of a marker N1 or N2 into the audio stream generated to the network N1, 1.

In a particular mode of any one of the preceding systems, the system comprises at least one of the means ISI positioned in an AUT terminal, 26, which is adapted for inserting the marker according to a chosen period so as to guarantee a distribution of the marker which is a sub-multiple of the send period of the audio packet.

In all the modes of the system the markers N1 or N2 differ from one another by at least one bit at the minimum, upon any comparison after all circular rotations of one of the markers with respect to the other.

In a particular mode of any one of the preceding systems, the system comprises markers N1 or N2 which differ from one another by at least one bit, over any portion of a given length, at the minimum upon any comparison after all circular rotations of one of the markers with respect to the other, said given length being linked with a detection threshold, either of blockage, or of authorization of passage, of said audio stream, in at least one of said corresponding means FISI-N1 or FISI-N2.

In a particular mode of any one of the preceding systems, the system comprises at least one of the means FISI positioned in one of the filtering gateways which is adapted for sending in the return pathway of the audio stream a tone for alerting non-detection of the configured marker, when the marker has not been detected after a deadline linked with the detection of a signal PTT transported in the VoIP encoding of said audio stream.

In a particular mode of the previous particular mode, the system comprises a transport of the signal PTT, either in at least one bit M encoded in the RTP protocol of said audio stream, or in the RTCP signaling encoded in the RTP protocol of said audio stream, or else in the audio band of the loads encoded in the RTP protocol.

In a particular mode of any one of the preceding systems, the system comprises a filtering device suitable for accepting a loss of packet without loss of detection of marking and therefore of blockage of the audio stream.

In a particular mode of any one of the preceding systems, the system comprises the encoding of at least one of the audio streams which is performed with the G711 A-law or mu-law format.

Advantages

In conclusion the system according to the invention offers notably the following advantages:

Allows one and the same user to: communicate with other users belonging to the same domain, communicate with other users belonging to another domain, broadcast a sound signal in a space (and therefore in a domain of lower security level), communicate with remote talkers, by encrypted and unencrypted radio means, communicate with talkers hooked up to a PABX, Records audio exchanges, Ensures that the audio streams of a higher security level do not travel accidentally on a lower security level, For several services (broadcasting, conferencing, recording) responds to the requirement to send one and the same audio stream to several facilities, Allows the use of COTS facilities so as to offer in a secure architecture so as to offer solutions which are upgradable in terms of services to the user, Implements ad hoc security levels for all services (including the broadcasting of instructions and alerts and telephonic services), Reduces the costs of development and accreditation of the constituents of the system by using 2 functions (ISI and FISI) which are configured for ad hoc markers.

Extension to other architectures and to other services.

TABLE III

| | | Point-to-point communications | | | | |
|---|---|---|---|---|---|---|
| | | Destination | | | | |
| | AUT | | MUT | | IP-Phone | |
| Origin | Facility | Action Protocol | Facility | Action Protocol | Facility | Action Protocol |
| AUT | AUT 1 | No mark Led1 green Led2 off | AUT | Mark DR Led1 off Led2 red flash | AUT | Mark N2 Led1 off Led2 red flash |
| | LAN N1 AUT 2 | IP | LAN N1 ISDN-GTW-N2 IP-BX PMR MUT | IP Filter IP -> ISDN ISDN ISDN side | LAN N1 RNIS-GTW-N2 IP-BX LAN N2 IP-Phone | IP Filter IP -> ISDN ISDN -> IP IP |

TABLE III-continued

Point-to-point communications

| Origin | | | | | | |
|---|---|---|---|---|---|---|
| MUT | MUT<br>PMR<br>IP-BX<br>RNIS-GTW-N2<br>LAN N1<br>AUT | ISDN side<br>ISDN<br>ISDN –> IP<br>IP | PMR | | MUT<br>PMR<br>IP-BX<br>LAN N2<br>IP-Phone | ISDN side<br>ISDN –> IP<br>IP |
| IP-Phone | IP-Phone<br>LAN N2<br>IP-BX<br>RNIS-GTW-N2<br>LAN N1<br>AUT | IP<br>IP –> ISDN<br>ISDN –> IP<br>IP | IP-Phone<br>LAN N2<br>IP-BX<br>PMR<br>MUT | IP<br>IP –> ISDN<br>ISDN side | IP-Phone<br>LAN N2<br>IP-BX<br>LAN N2<br>IP-Phone | IP<br>IP<br>IP |
| UWT | UWT<br>A-GTW-N2<br>LAN N1<br>AUT | BF –> IP<br>IP | X | | X | |
| Radio Chiffre | E/R<br>Crypto<br>A-GTW-N1<br>LAN N1<br>AUT | Encrypted LF<br>Decrypt<br>Clear LF<br>BF –> IP<br>IP | X | | X | |
| Radio Claire | E/R<br>A-GTW-N2<br>LAN N1<br>AUT | Clear LF<br>BF –> IP<br>IP | X | | X | |
| Encrypted Radio Return | A-GTW-N1<br>LAN N1<br>AUT | BF –> IP<br>IP | X | | X | |
| Clear Radio Return | A-GTW-N2<br>LAN N1<br>AUT | BF –> IP<br>IP | X | | X | |

| | Destination | | | | | |
|---|---|---|---|---|---|---|
| | UWT | | Encrypted Radio | | Clear radio | |
| Origin | Facility | Action Protocol | Facility | Action Protocol | Facility | Action Protocol |
| AUT | AUT<br><br><br>LAN N1<br>A-GTW-N2<br><br><br>UWT | Mark N2<br>Led1 off<br>Led2 red flash<br>IP<br>Filter<br>Unmark<br>IP –> LF | AUT<br><br><br>LAN N1<br>A-GTW-N1<br><br><br>Crypto<br>E/R | Mark N1<br>Led1 green<br>Led2 off<br>IP<br>Filter<br>Unmark<br>IP –> LF<br>Encrypt<br>Encrypted LF | AUT<br><br><br>LAN N1<br>A-GTW-N2<br><br><br>E/R | Mark N2<br>Led1 off<br>Led2 red flash<br>IP<br>Filter<br>Unmark<br>IP –> LF<br>Clear LF |
| MUT | X | | X | | X | |
| IP-Phone | X | | X | | X | |
| UWT | X | | X | | X | |
| Radio Chiffre | X | | X | | X | |
| Radio Claire | X | | X | | X | |
| Encrypted Radio Return | X | | X | | X | |
| Clear Radio Return | X | | X | | X | |

TABLE IV

Point-to-point communications with recording

| | Destination | | | | | |
|---|---|---|---|---|---|---|
| | AUT | | MUT | | IP-Phone | |
| Origin | Facility | Action Protocol | Facility | Action Protocol | Facility | Action Protocol |
| AUT | AUT 1 | No Mark<br>Led1 green | AUT | Mark N2<br>Led1 off | AUT | Mark N2<br>Led1 off |

TABLE IV-continued

Point-to-point communications with recording

| | | | | | | | |
|---|---|---|---|---|---|---|---|
| | | Led2 off | | Led2 red flash | | Led2 red flash | |
| | LAN N1 | IP | LAN N1 | IP | LAN N1 | IP | |
| | MCU N1 | Unmark | RNIS-GTW-N2 | Filter | RNIS-GTW-N2 | Filter | |
| | | Broadcast to | | IP –> RNIS | | IP –> ISDN | |
| | | (1) AUT 2 and | IP-BX | ISDN | IP-BX | ISDN –> IP | |
| | | (2) Rec N1 | Rec. N2 | Record | Rec. N2 | Record | |
| | | | PMR | ISDN side | LAN N2 | IP | |
| | | | MUT | | IP-Phone | | |
| | (1) LAN N1 | IP | | | | | |
| | AUT 2 | | | | | | |
| | (2) LAN N1 | IP | | | | | |
| | Rec_N1 | | | | | | |
| MUT | MUT | | | | MUT | | |
| | PMR | ISDN side | PMR | | PMR | ISDN side | |
| | IP-BX | ISDN | | | IP-BX | ISDN –> IP | |
| | Rec N2 | Record | | | Rec N2 | Record | |
| | RNIS-GTW-N2 | ISDN –> IP | | | LAN N2 | IP | |
| | LAN N1 | IP | | | IP-Phone | | |
| | AUT | | | | | | |
| IP-Phone | IP-Phone | | IP-Phone | | IP-Phone | | |
| | LAN N2 | IP | LAN N2 | IP | LAN N2 | IP | |
| | IP-BX | IP –> ISDN | IP-BX | IP –> ISDN | IP-BX | IP | |
| | Rec N2 | Record | Rec N2 | Record | Rec N2 | Record | |
| | RNIS-GTW-N2 | ISDN –> IP | PMR | ISDN side | LAN N2 | IP | |
| | LAN N1 | IP | MUT | | IP-Phone | | |
| | AUT | | | | | | |
| UWT | UWT | | | X | | X | |
| | A-GTW- N2 | BF –> IP | | | | | |
| | | Broadcast to | | | | | |
| | | (1) AUT and | | | | | |
| | | (2) Rec N1 | | | | | |
| | (1) LAN N1 | IP | | | | | |
| | AUT | | | | | | |
| | (2) LAN N1 | IP | | | | | |
| | Rec N1 | | | | | | |
| Encrypted | E/R | Encrypted LF | | X | | X | |
| Radio | Crypto | Unencrypt | | | | | |
| | | Clear LF | | | | | |
| | A-GTW- N1 | BF –> IP | | | | | |
| | | Broadcast to | | | | | |
| | | (1) AUT and | | | | | |
| | | (2) Rec N1 | | | | | |
| | (1) LAN N1 | IP | | | | | |
| | AUT | | | | | | |
| | (2) LAN N1 | IP | | | | | |
| | Enreg N1 | | | | | | |
| Clear | E/R | Clear LF | | X | | X | |
| Radio | A-GTW-N2 | BF –> IP | | | | | |
| | | Broadcast to | | | | | |
| | | (1) AUT and | | | | | |
| | | (2) Rec N1 | | | | | |
| | LAN N1 | IP | | | | | |
| | (1) LAN N1 | IP | | | | | |
| | AUT | | | | | | |
| | (2)LAN N1 | IP | | | | | |
| | Rec N1 | | | | | | |
| Encrypted | | X | | X | | X | |
| Radio | | | | | | | |
| Return | | | | | | | |
| Clear | | X | | X | | X | |
| Radio | | | | | | | |
| Return | | | | | | | |

| | | Destination | | | | | |
|---|---|---|---|---|---|---|---|
| | | UWT | | Encrypted Radio | | Clear Radio | |
| Origin | Facility | Action Protocol | Facility | Action Protocol | Facility | Action Protocol | |
|---|---|---|---|---|---|---|---|
| | AUT | AUT | Mark N2 | AUT | Mark N1 | AUT | Mark N2 |
| | | | Led1 off | | Led1 green | | Led1 off |
| | | | Led2 red flash | | Led2 off | | Led2 red flash |
| | | LAN N1 | IP | LAN N1 | IP | LAN N1 | IP |
| | | A-GTW-N2 | Filter | A-GTW- N1 | Filter | A-GTW-DR | Filter |
| | | | Unmark | | Unmark | | Unmark |
| | | | IP –> BF | | IP –> BF | | IP –> BF |
| | | | Broadcast to | | Broadcast to | | Broadcast to |

TABLE IV-continued

| | | | Point-to-point communications with recording | | | | | |
|---|---|---|---|---|---|---|---|---|
| | | (1) UWT | (1) UWT and (2) Rec. N1 | (1) Crypto E/R | (1) radio and (2) Rec. N1 Encrypt Encrypted LF | (1) E/R | (1) radio and (2) Rec. N1 Clear LF | |
| | | (2)LAN N1 Rec._N1 | IP | (2) LAN N1 Rec._N1 | IP | (2) LAN N1 Rec._N1 | IP | |
| | MUT | X | | X | | X | | |
| | IP-Phone | X | | X | | X | | |
| | UWT | X | | X | | X | | |
| | Encrypted Radio | X | | X | | X | | |
| | Clear Radio | X | | X | | X | | |
| | Encrypted Radio Return | X | | X | | X | | |
| | Clear Radio Return | X | | X | | X | | |

TABLE V

| | | | Conferences | | | |
|---|---|---|---|---|---|---|
| | | | Destination | | | |
| | AUT | | MUT in conference AUT | | MUT in "talk group" | |
| Origin | Facility | Action Protocol | Facility | Action Protocol | Facility | Action Protocol |
| AUT | AUT | No mark Led1 green Led2 off | AUT | Mark N2 Led1 off Led2 red flash | AUT | Mark N2 Led1 off Led2 red flash |
| | LAN N1 MCU N1 | IP Unmark Broadcast to other AUT(s) | LAN N1 A-GTW-N2 | IP Filter Broadcast to (1) AUT(s) (2) PMR | LAN N1 A-GTW-H2 PMR MUT | IP IP -> BF analog side |
| | LAN N1 Other AUT(s) | IP | | | | |
| | | | (1) LAN N1 AUT(s) (2) A-GTW-N2 PMR MUT | IP IP -> BF Analog side | | |
| MUT in conference AUT | MUT PMR A-GTW- N2 | Analog side BF -> IP Broadcast to AUT(s) | | X | | X |
| | LAN N1 AUT(s) | IP | | | | |
| MUT in "talk group" | MUT PMR A-GTW-N2 LAN N1 AUT | Analog side BF -> IP IP | | X | PMR | |
| MUT out of conference | | X | | X | PMR | |
| IP-Phone | | X | | X | | X |
| Telebrief | Telebrief A-GTW- N1 LAN N1 MCU | BF -> IP IP Unmark Broadcast to AUT(s) | | X | | X |
| | LAN N1 AUT(s) | IP | | | | |
| IAB | | X | | X | | X |

TABLE V-continued

| | | Conferences | | | |
|---|---|---|---|---|---|
| | | \multicolumn{4}{c}{Destination} |
| | | Telebrief | | IAB | |
| Origin | IP-Phone | Facility | Action Protocol | Facility | Action Protocol |
| AUT | X | AUT | No mark Led1 green Led2 off | AUT | Mark N2 Led1 off Led2 red flash |
| | | LAN N1 | IP | LAN N1 | IP |
| | | MCU | Unmark Broadcast to (1) AUT and (2) A-GTW-N1 | RNIS-GTW-N2 | Filter IP -> RNIS RNIS -> IP |
| | | | | IP-BX | |
| | | | | Rec N2 | Record |
| | | | | LAN N2 | IP |
| | | | | MCU N2 | Broadcast to A-GTW(s) |
| | | | | LAN N2 | IP |
| | | | | A-GTW(s) | IP -> BF |
| | | | | IAB | |
| | | (1) LAN N1 AUT | IP | | |
| | | (2) LAN N1 A-GTW-N1 Telebrief | IP IP -> BF | | |
| MUT in conference AUT | X | X | | X | |
| MUT in "talk group" | X | X | | X | |
| MUT out of conference | X | X | | MUT PMR IP-BX LAN N1 Rec N1 MCU N1 LAN N1 A-GTW (s) IAB | ISDN side ISDN IP Record Broadcast to A-GTW (s) IP IP -> BF |
| IP-Phone | X | X | | IP-Phone LAN N1 IP-BX REC N1 LAN N1 MCU N1 LAN N1 A-GTW(s) IAB | IP IP -> RNIS Record IP Broadcast to A-GTW (s) IP IP -> BF |
| Telebrief | | X | | X | |
| IAB | X | X | | X | |

The invention claimed is:

1. A system to allow exchange of data between a first security domain having a first security level and a second security domain having a second security level, wherein the first security level is higher than the second security level, wherein the first security domain comprises a first network transporting audio streams using at least one of IP and VoIP Internet protocols, wherein the system comprises:

an insertion circuit to insert a security-level marker into audio streams as a function of the security level of the audio streams, by use of terminals in communication with the first network, the insertion circuit replacing predetermined bits of audio data in the audio streams with corresponding bits of the security-level marker;

a filter circuit to filter the audio streams by use of a first and second filtering gateway, said filtering gateways being in communication with the first network, said filtering gateways being adapted to transform a communication protocol of the audio streams into another communication protocol;

a detector circuit to detect the presence of a security-level marker in the audio stream arising from the first network, to produce a detected security-level marker; and a monitoring circuit to monitor consistency between the detected security-level marker and the security-level marker inserted into the audio streams.

2. The system as claimed in claim 1, wherein at least one audio stream comprises a channel of a multimedia communication session.

3. The system as claimed in claim 1, wherein at least one of the filtering gateways comprises an ISDN filtering gateway, connected to an IP-BX telephone exchange office, said ISDN filtering gateway used to translate the VoIP audio streams from the first network into an ISDN protocol, wherein the streams exchanged between said ISDN filtering gateway and said IP-BX telephone exchange office comprise ISDN streams.

4. The system as claimed in claim 3, wherein one or more IP-BX telephone exchange offices is connected to a second network of the second security level.

5. The system as claimed in claim 3, further comprising:
an ISDN gateway in communication with one or more IP-BX telephone exchange offices;
a plurality of radio sets of a radio sub-system, said radio sets in communication with the ISDN gateway; and
an analog gateway in communication with the plurality of radio sets and in communication with the filtering gateways of the first network.

6. The system according to claim 4, wherein an analog facility of the second network is linked with the first network by use of one of said analog filtering gateways configured to perform an IP/analog protocol break and a stream filtering procedure, said analog filtering gateway being adapted to perform a protocol transformation between the analog and the IP protocol, the protocol transformation comprising the steps of:
transforming, into an LF audio signal, the audio streams received from the first network, the audio streams having a second predetermined security-level marker; and
transforming, into a VoIP-encoded audio stream, analog LF audio signals destined for the first network.

7. The system as claimed in claim 1, wherein an analog facility of the first security domain is linked with the first network by use of one of said analog filtering gateways configured to perform an IP/analog protocol break and a stream filtering procedure, said analog filtering gateway being adapted to perform a protocol transformation between the analog and the IP protocol, the protocol transformation comprising the steps of:
transforming, into an LF audio signal, the audio streams received from the first network, the audio streams having a first predetermined security-level marker; and
transforming, into a VoIP-encoded audio stream, analog LF audio signals destined for the first network.

8. The system as claimed in claim 1, wherein said terminal is adapted to control a display that confirms the insertion of at least one of a first and second security-level marker into the audio stream generated by the first network.

9. The system as claimed in claim 1, wherein said terminal is adapted to insert said security-level marker according to a chosen period in order to produce a distribution of the security-level marker which is a sub-multiple of a send period of the audio stream.

10. The system as claimed in claim 1, wherein at least one of said first and second security-level markers differ from one another by at least one bit, upon comparison of circular rotations of the security-level markers.

11. The system according to claim 1, wherein said first and second security-level markers differ from one another by at least one bit, over a predetermined length, upon comparison of circular rotations of the security-level markers, said predetermined length being associated with one of a detection threshold to block or to authorize passage of said audio stream, in at least one of said analog filtering gateways.

12. The system as claimed in claim 1, wherein at least one of said analog filtering gateways is further configured to send in the return pathway of said audio stream a tone to indicate non-detection of the configured security-level marker, if said security-level marker has not been detected after a deadline linked with detection of a push-to-talk (PTT) signal transported in a VoIP encoding of said audio stream.

13. The system as claimed in claim 12, wherein said PTT signal is transported in at least one of:
one bit M encoded in an RTP protocol of said audio stream;
an RTCP signaling encoded in the RTP protocol of said audio stream; and
an audio band of loads encoded in the RTP protocol.

14. The system as claimed in claim 1, further comprising a filter adapted to accept a loss of packet without loss of detection of the security-level marker and without blockage of the audio stream.

15. The system as claimed in claim 1, wherein the encoding of at least one of said audio streams comprises one of a G711 A-law encoding and a mu-law encoding.

* * * * *